United States Patent
Cook et al.

[11] Patent Number: 6,016,690
[45] Date of Patent: Jan. 25, 2000

[54] AUTOMOTIVE EVAPORATIVE EMISSION LEAK DETECTION SYSTEM AND METHOD

[75] Inventors: John E. Cook; Paul D. Perry; Paul V. Terek, all of Chatham, Canada

[73] Assignee: Siemens Canada Limited, Mississauga, Canada

[21] Appl. No.: 09/036,128

[22] Filed: Mar. 6, 1998

Related U.S. Application Data

[60] Provisional application No. 60/057,962, Sep. 5, 1997, and provisional application No. 60/058,275, Sep. 9, 1997.

[51] Int. Cl.$^7$ .................................................... G01M 3/32
[52] U.S. Cl. .......................... 73/49.2; 73/40.5 R; 73/49.7
[58] Field of Search ................... 73/40.5 R, 49.2, 73/49.7; 123/516, 518, 519, 520

[56] References Cited

U.S. PATENT DOCUMENTS

| | | | |
|---|---|---|---|
| 4,628,959 | 12/1986 | Parker et al. . | |
| 4,886,085 | 12/1989 | Miller . | |
| 5,277,167 | 1/1994 | DeLand et al. | 123/518 |
| 5,327,776 | 7/1994 | Yasui et al. | 73/49.2 |
| 5,623,911 | 4/1997 | Kiyomiya et al. . | |
| 5,637,788 | 6/1997 | Remboski et al. | 73/49.2 X |
| 5,644,072 | 7/1997 | Chirco et al. | 73/49.2 |
| 5,727,530 | 3/1998 | Honda et al. . | |
| 5,730,107 | 3/1998 | Blumenstock . | |
| 5,749,349 | 5/1998 | Detweiler et al. . | |
| 5,803,054 | 9/1998 | Yamazaki et al. . | |
| 5,817,925 | 10/1998 | Cook et al. | 73/49.7 X |
| 5,850,819 | 12/1998 | Kunimitsu et al. . | |
| 5,853,018 | 12/1998 | DeLand et al. . | |
| 5,853,162 | 12/1998 | Zurke . | |

*Primary Examiner*—Daniel S. Larkin

[57] ABSTRACT

A leak detection method for an on-board evaporative emission leak detection system that detects leakage from an evaporative emission space of a fuel system of an automotive vehicle. During a leak detection test, a vent valve closes, and a purge valve, that selectively communicates the evaporative emission space with the engine intake manifold, opens to cause vacuum to be drawn in the evaporative emission space. A vacuum regulator valve regulates evaporative emission space vacuum to a defined vacuum. Subsequently, the purge valve closes. Loss of vacuum, indicative of leakage, is signaled by a pressure sensor. An algorithm detects a substantially constant rate of vacuum loss and then measures the amount of loss over a defined time interval. That measurement is then compensated for volume of the evaporative emission space and rate of fuel volatilization to arrive at a value forming a basis for making a leakage determination.

11 Claims, 5 Drawing Sheets

AUTOMOTIVE EVAPORATIVE EMISSION LEAK DETECTION SYSTEM AND METHOD

REFERENCE TO RELATED APPLICATION AND PRIORITY CLAIM

This application expressly claims the benefit of earlier filing date and right of priority from the following co-pending patent applications: U.S. Provisional Application Ser. No. 60/057,962 (Attorney Docket 97P7697US) filed on Sep. 5, 1997 in the names of Cook et al, entitled "Automotive Evaporative Emission Leak Detection System and Method," and U.S. Provisional Application Ser. No. 60/058,275 (Attorney Docket US 97P7702US) filed on Sep. 9, 1997 in the names of Cook et al., entitled "Evaporative Emission Leak Detection System," each of which provisional patent application is expressly incorporated in its entirety by reference.

FIELD OF THE INVENTION

This invention relates generally to an on-board system for detecting fuel vapor leakage from an evaporative emission space of an automotive vehicle fuel system. More particularly it relates to a system that utilizes vacuum drawn by the engine intake manifold for performing a leak test, and to a module for such a system.

BACKGROUND OF THE INVENTION

A known on-board evaporative emission control system for an automotive vehicle comprises a vapor collection canister that collects volatile fuel vapors generated in the headspace of the fuel tank by the volatilization of liquid fuel in the tank and a purge valve for periodically purging fuel vapors to an intake manifold of the engine. A known type of purge valve, sometimes called a canister purge solenoid (or CPS) valve, comprises a solenoid actuator that is under the control of a microprocessor-based engine management system, sometimes referred to by various names, such as an engine management computer or an engine electronic control unit.

During conditions conducive to purging, evaporative emission space that is cooperatively defined primarily by the tank headspace and the canister is purged to the engine intake manifold through the canister purge valve. A CPS-type valve is opened by a signal from the engine management computer in an amount that allows intake manifold vacuum to draw fuel vapors that are present in the tank headspace and/or stored in the canister for entrainment with combustible mixture passing into the engine's combustion chamber space at a rate consistent with engine operation so as to provide both acceptable vehicle driveability and an acceptable level of exhaust emissions.

Certain governmental regulations require that certain automotive vehicles powered by internal combustion engines which operate on volatile fuels such as gasoline, have evaporative emission control systems equipped with an on-board diagnostic capability for determining if a leak is present in the evaporative emission space. It has heretofore been proposed to make such a determination by temporarily creating a pressure condition in the evaporative emission space which is substantially different from the ambient atmospheric pressure, and then watching for a change in that substantially different pressure which is indicative of a leak.

It is believed fair to say that there are two basic types of diagnostic systems and methods for determining integrity of an evaporative emission space against leakage.

Commonly owned U.S. Pat. No. 5,146,902 "Positive Pressure Canister Purge System Integrity Confirmation" discloses one type: namely, a system and method for making a leakage determination by pressurizing the evaporative emission space to a certain positive pressure therein (the word "positive" meaning relative to ambient atmospheric pressure) and then watching for a drop in positive pressure indicative of a leak. Other positive pressure type systems are disclosed in commonly owned U.S. Pat. Nos. 5,383,437; and 5,474,050.

The other of the two general types of systems for making a leakage determination does so by creating in the evaporative emission space a certain negative pressure (the word "negative" meaning relative to ambient atmospheric pressure so as to denote vacuum) and then watching for a loss of vacuum indicative of a leak. A known procedure employed by this latter type of system in connection with a diagnostic test comprises utilizing engine manifold vacuum to create vacuum in the evaporative emission space. Because that space may, at certain non-test times, be vented through the canister to allow vapors to be efficiently purged when the CPS valve is opened for purging fuel vapors from the tank headspace and canister, it is known to communicate the canister vent port to atmosphere through a vent valve that is open when vapors are being purged to the engine, but that closes preparatory to a diagnostic test so that a desired test vacuum can be drawn in the evaporative emission space for the test. Once a desired vacuum has been drawn, the purge valve is closed, and leakage appears as a loss of vacuum during the length of the test time after the purge valve has closed.

In order for an engine management computer to ascertain when a desired vacuum has been drawn so that it can command the purge valve to close, and for loss of vacuum to thereafter be detected, it is known to employ an electric sensor, or transducer, that measures negative pressure, i.e. vacuum, in the evaporative emission space by supplying a measurement signal to the engine management computer. It is known to mount such a sensor on the vehicle's fuel tank where it will be exposed to the tank headspace. For example, commonly owned U.S. Pat. No. 5,267,470 discloses a pressure sensor mounting in conjunction with a fuel tank roll-over valve.

SUMMARY OF THE INVENTION

One generic aspect of the present invention relates to a leak detection test method for an evaporative emission space of a fuel storage system of an automotive vehicle comprising: creating a differential between pressure in an evaporative emission space and atmospheric pressure and regulating, by a regulator valve, the created differential to a defined differential sufficient to perform a leak detection test on the evaporative emission space; isolating the evaporative emission space so that reduction in the regulated created differential is indicative of leakage from the evaporative emission space; and sensing reduction in the regulated created differential in which the step of creating a differential between pressure in an evaporative emission space and atmospheric pressure and regulating, by a regulator valve, the created differential to a defined differential sufficient to perform a leak detection test on the evaporative emission space comprises creating vacuum in the evaporate emission space and regulating the created vacuum to a regulated vacuum by a vacuum regulator valve.

Another generic aspect of the invention relates to a leak detection test method for an evaporative emission space of a fuel storage system of an automotive vehicle comprising: creating a differential between pressure in an evaporative emission space and atmospheric pressure and regulating, by a regulator valve, the created differential to a defined differential sufficient to perform a leak detection test on the evaporative emission space; isolating the evaporative emission space so that reduction in the regulated created differential; in which the step of sensing reduction in the regulated created differential comprises sensing such reduction by a sensor that develops an electric signal indicative of such reduction; and including the step of detecting a substantially constant rate of reduction in the regulated created differential by detecting substantially constant rate of change in the electric signal, and then measuring the rate of change in the electric signal over a defined time interval.

Another generic aspect of the invention relates to a leak detection test method for an evaporative emission space of fuel storage system of an automotive vehicle comprising: creating a differential between pressure in an evaporative emission space and atmospheric pressure and regulating, by a regulator valve, the created differential to a defined differential sufficient to perform a leak detection test on the evaporative emission space; isolating the evaporative emission space so that reduction in the regulated created differential is indicative of leakage from the evaporative emission space; and sensing reduction in the regulated created differential; including the step of detecting a substantially constant rate of reduction in the regulated created differential, and then measuring the regulated over a defined time interval.

Another generic aspect of the present invention relates to a method for initializing an evaporative emission space of a fuel storage system of an automotive vehicle for a leak detection test comprising: creating a differential between pressure in an evaporative emission space and atmospheric pressure and regulating, by a regulator valve, the created differential to a defined differential sufficient to perform a leak detection test on the evaporative emission space; the regulating step comprising closing a flow path through a movable wall of the regulator valve when the created differential is less than the defined differential and opening the flow path when the created differential is greater than the defined differential.

The foregoing, and other features, along with various advantages and benefits of the invention, will be seen in the ensuing description and claims which are accompanied by drawings. The drawings, which are incorporated herein and constitute part of this specification, disclose a preferred embodiment of the invention according to the best mode contemplated at this time for carrying out the invention.

DESCRIPTION OF THE PREFERRED EMBODIMENTS

Figure 1:
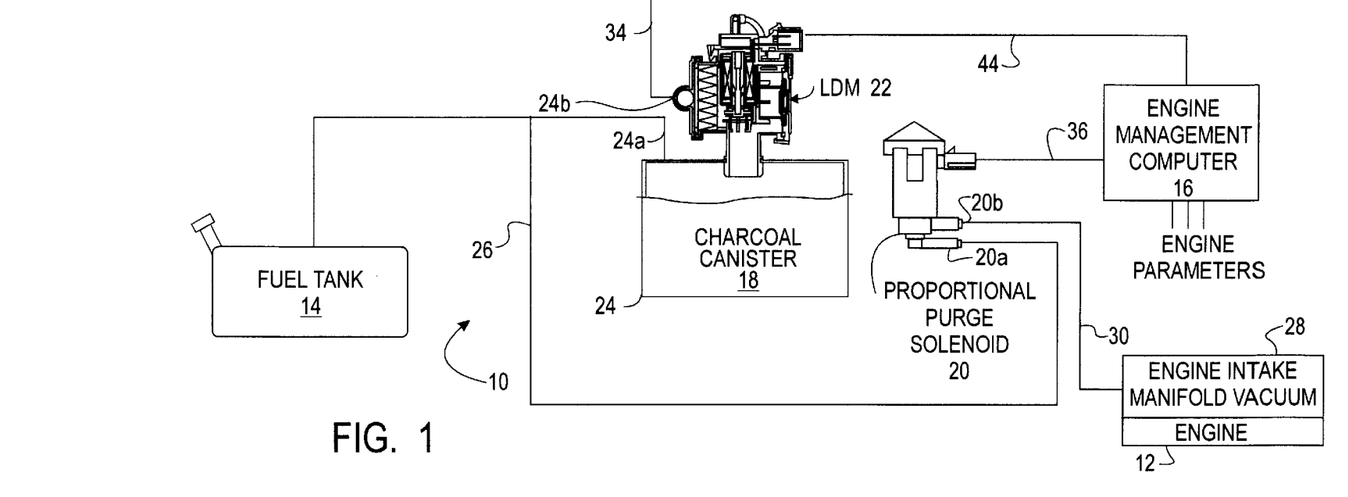
FIG. 1 is a general schematic diagram of an automotive vehicle evaporative emission control system including a leak detection system and leak detection module embodying principles of the invention.

FIG. 1 shows an automotive vehicle evaporative emission control (EEC) system 10 in association with an internal combustion engine 12 that powers the vehicle, a fuel tank 14 that holds a supply of volatile liquid fuel for the engine, and an engine management computer (EMC) 16 that exercises certain controls over operation of engine 12. EEC system 10 comprises a vapor collection canister (charcoal canister) 18, a proportional purge solenoid (PPS) valve 20, and a leak detection module (LDM) 22. In the illustrated embodiment, LDM 22 is shown mounted atop canister 18 so they form an integrated assembly, or module, 24.

Headspace of fuel tank 14, a port 24a of module 24, and an inlet port 20a of PPS valve 20 are placed in common fluid communication by a conduit 26 so that the tank headspace and the canister cooperatively define evaporative emission space within which fuel vapors generated by volatilization of fuel in tank 14 are temporarily confined and collected until purged to an intake manifold 28 of engine 12. Another conduit 30 fluid-connects an outlet port 20b of PPS valve 20 with intake manifold 28. Another conduit 34 fluid-connects a port 24b of module 24 to atmosphere.

EMC 16 receives a number of inputs (engine-related parameters for example) relevant to control of certain operations of engine 12 and its associated systems, including EEC system 10. One electrical output port of EMC 16 controls PPS valve 20 via an electrical connection 36; other ports of EMC 16 are coupled with module 24 via electrical connections, depicted generally by the reference numeral 44 in FIG. 1.

From time to time, EMC 16 commands LDM 22 to perform a leak detection test for ascertaining the integrity of EEC system 10, particularly the evaporative emission space that contains volatile fuel vapors, against leakage. During such test times, EMC 16 commands PPS valve 20 to open condition to enable manifold vacuum to be drawn in the evaporative emission space being tested. At times of engine running other than during such test times, EMC 16 operates PPS valve 20 to purge vapors from the evaporative emission space, including vapor adsorbent medium in canister 18, in a scheduled manner, but without creating vacuum magnitudes in the evaporative emission space that are comparable to those drawn during a test. LDM 22 is operated by EMC 16 according to whether testing is being conducted.

EMC 16 selectively operates PPS valve 20 during non-test times such that the valve opens under conditions conducive to purging and closes under conditions not conducive to purging. During those times, LDM 22 assumes a condition of providing relatively unrestricted venting of the evaporative emission space to atmosphere. Thus, during times of operation of the automotive vehicle, the canister purge function is performed in a known manner for the particular vehicle and engine so long as a leak detection test is not being performed. When a leak detection test is commenced, EMC 16 operates PPS valve 20 open to communicate the evaporative emission space to intake manifold vacuum, and it causes LDM 22 to close the normally unrestricted vent to atmosphere. Consequently, vacuum begins to be drawn, in the evaporative emission space, accompanied by fuel vapor purging. LDM 22 further includes a vacuum regulator that is effective during a test to regulate evaporative emission space vacuum to a predetermined magnitude, and once that vacuum level has been attained and achieves substantial stability, a leakage determination can be made.

Figure 2:
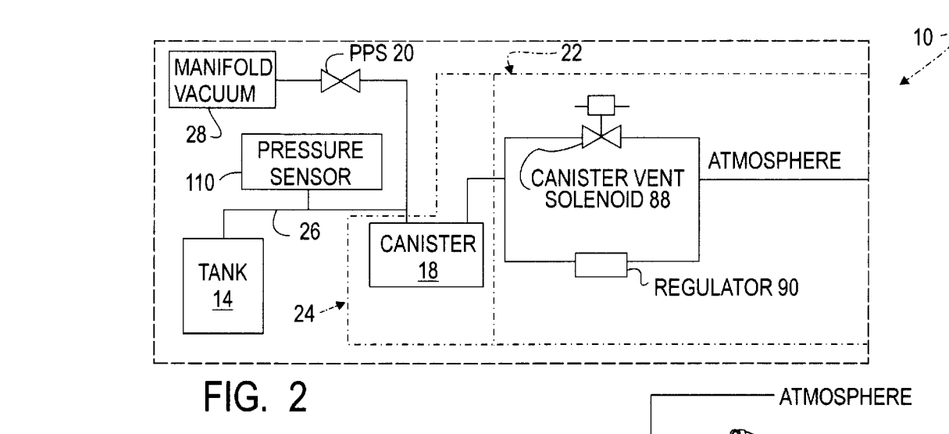
FIG. 2 is a more detailed schematic diagram of certain portions of FIG. 1.

FIG. 2 schematically depicts LDM 22 in conjunction with components already described. Structural detail of LDM 22 is presented in FIGS. 3–6. The latter show LDM 22 to comprise a main body 50, preferably fabricated from suitable fuel-resistant plastic. Main body 50, per se, comprises a walled structure having several openings. One opening comprises an integral nipple 52 through which main body 50 can be placed in fluid communication with the interior of canister 18. Another opening opposite nipple 52 is closed by a sensor cap assembly 54. A third opening in a side wall of main body 50 is closed by a filter cap 56. A fourth opening opposite the third is closed by a regulator cap 58.

Figure 3:
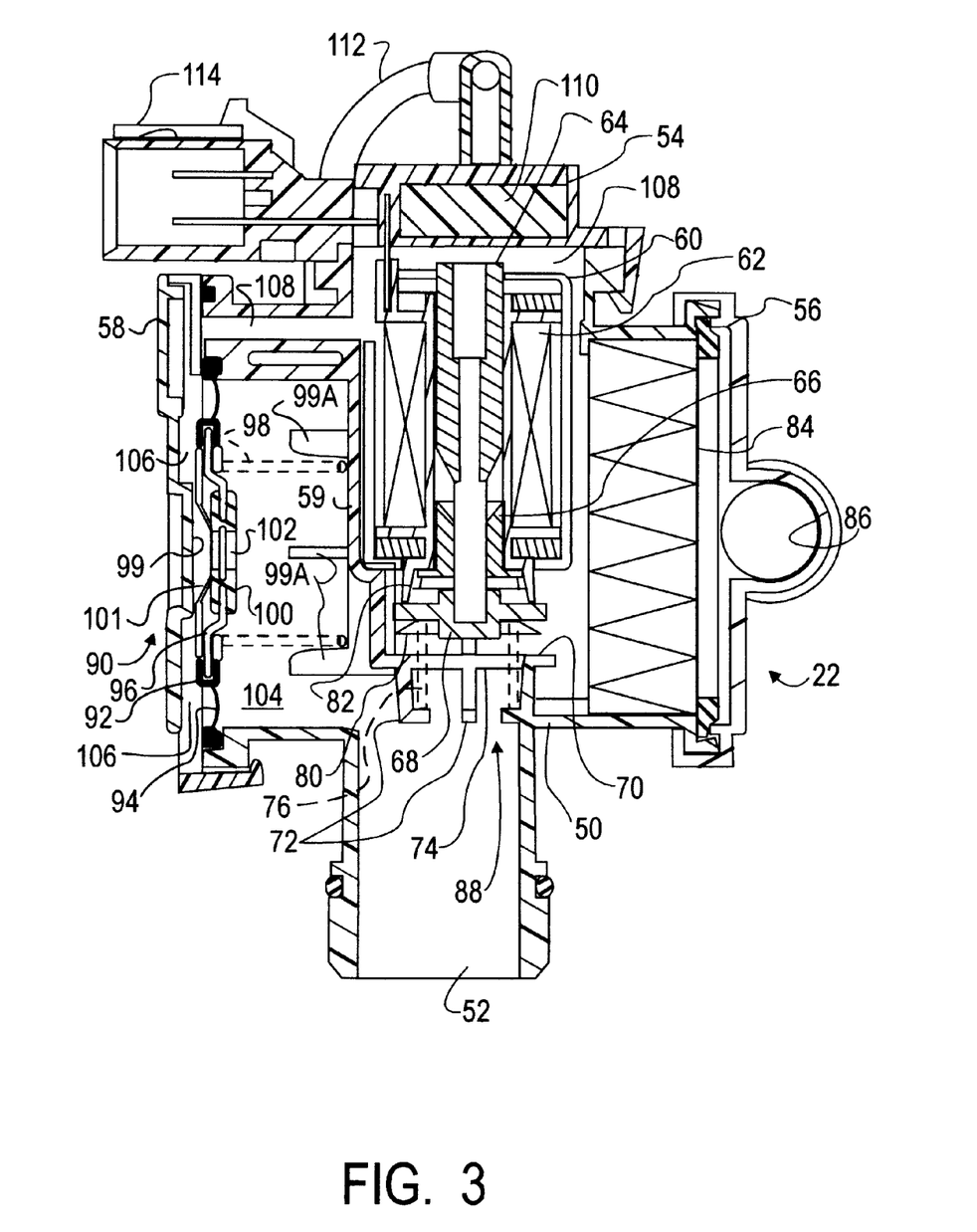
FIG. 3 is an elevation view, in cross section, through an exemplary canister-mounted leak detection module adapted for mounting on a vapor collection canister of an evaporative emission control system.
Figure 4:
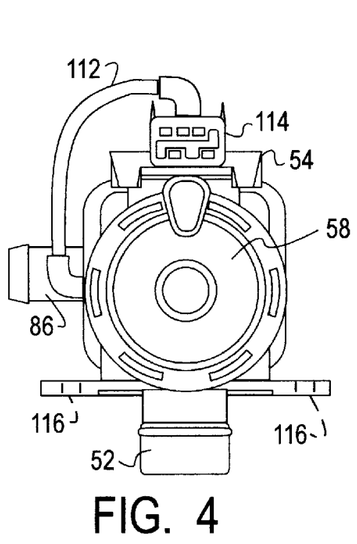
FIG. 4 is a full left side elevation view of FIG. 3, on a reduced scale.
Figure 5:
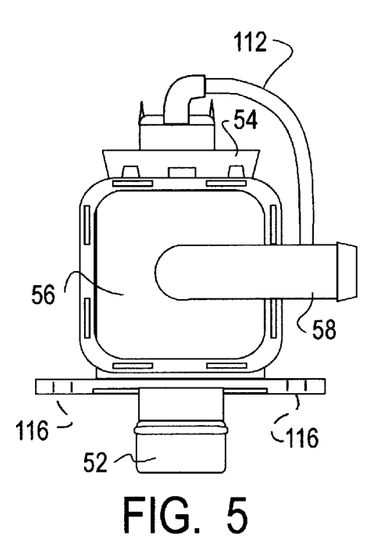
FIG. 5 is a full right side elevation view of FIG. 3, on a reduced scale.
Figure 6:
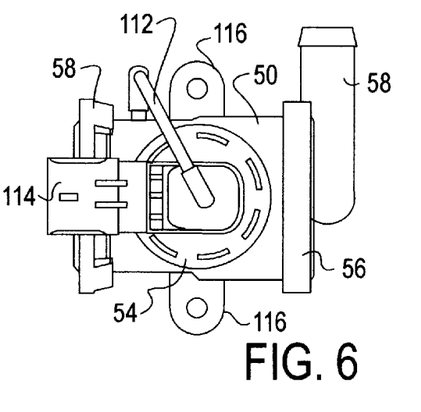
FIG. 6 is a full top view of FIG. 3, on a reduced scale.

The interior of main body 50 comprises a walled receptacle 59 containing a solenoid assembly 60. Solenoid assembly 60 is assembled into receptacle 59 through the opening that is subsequently closed by sensor cap assembly 54. Solenoid assembly 60 comprises a bobbin-mounted electromagnetic coil 62 and an associated stator structure composed of several ferromagnetic parts to form a portion of the solenoid's magnetic circuit. A cylindrical ferromagnetic armature 64 cooperates with this stator structure to complete the magnetic circuit via air gaps between the stator structure and the armature. Armature 64 is arranged coaxial with a main axis of the solenoid and is guided for straight line motion along that axis within the bobbin that contains coil 62. As shown by FIG. 3, the confronting, complementary tapered, axial ends of armature 64 and a stator part 66 are separated by an air gap of the magnetic circuit.

A non-ferromagnetic valve element 68 has a circular-shaped head and a cylindrical stem for attachment to armature 64. Receptacle 59 comprises an integral valve seat 70, including several formations 72 disposed around a central through-hole 74 therein which provide a seat for seating one end of a helical coiled compression spring 76. The other end of spring 76 is centered on the face of the head of valve element 68, fitting over a boss formed in the valve head face. The valve head contains an annular one-piece lip seal 80. Spring 76 continuously biases the valve head away from seat 70 and toward a stop 82 so that the through-hole 74 is normally open. Thus, solenoid assembly 60 and valve seat 70 form a normally open solenoid-operated valve within main body 50.

The opening in main body 50 that is closed by filter cap 56 encloses a particulate filter element 84 within the main body. Filter element 84 is in filtering relation to a nipple 86 that extends from filter cap 56 as an integral formation thereof. Interior of main body 50, filter element 84 faces a side of receptacle 59. The receptacle wall contains an opening that places the filter element in fluid communication with valve seat 70 on the interior end of through-hole 74. Hence, when seal 80 is not seated on seat 70, the valve is open, allowing substantially unrestricted flow through filter element 84 between nipples 86 and 52. When seal 80 seats on the seat closing the valve, that flow path is closed. The solenoid-operated valve may therefore be identified as a canister vent solenoid valve (CVS valve), shown schematically at 88 in FIG. 2 as one portion of LDM 22.

FIG. 2 shows LDM 22 to also comprise a vacuum regulator 90 in parallel flow relation with CVS valve 88. Vacuum regulator 90 comprises a movable wall 92 disposed in covering relation to the opening in main body 50 that is closed by regulator cap 58. Movable wall 92 comprises a generally annular part 94 containing a flexible convolution. The otherwise open center of part 94 is closed by a rigid circular, annular insert 96. The outer margin of insert 96 is offset relative to its center to provide a seat for one axial end of a helical coil compression spring 98. The opposite axial end of spring 98 seats within a circular array of formations 99A on a side of receptacle 59 opposite filter element 84. Spring 98 therefore continuously urges the central region of movable wall 92 axially in a direction toward regulator cap 58.

At its center, regulator cap 58 contains a flat surface 99 confronting the center of insert 96. The center of the insert contains a part 100, preferably, elastomeric in character, having a main body that fills the circular hole that would otherwise be open in the center of insert 96. Part 100 includes an integral frustoconical lip 101 that in the position depicted by FIG. 3 is shown sealing against surface 99 due to the bias force exerted by spring 98. At its center, insert 96 has a through-hole 102. In the FIG. 3 position, the sealed relationship of lip 101 with surface 99 effectively prevents flow through the through-hole. Displacement of insert 96 away from the FIG. 3 position will unseal lip 101 from surface 99 to allow flow through through-hole 102.

The placement of movable wall 92 across the opening that is closed by regulator cap 58 serves to divide a first chamber 104 from a second chamber 106. FIG. 3 shows chamber 104 to be continuously open to nipple 52. Also, chamber 106 is continuously open to nipple 86 through filter element 84 via an internal passage 108 that includes a hole through the margin of part 94 aligned with an end of a hole in main body 50.

Disposed within the body opening that is closed by sensor cap assembly 54 is a pressure sensor 110. This body opening provides a receptacle for the body of sensor 110 including an opening that communicates an atmospheric reference port of the sensor to passage 108. The sensor comprises a vacuum sensing port that is continuously communicated by a hose assembly 112 to chamber 104. Sensor 110 provides to EMC 16 a signal representing the pressure difference between its two sensing ports, hence a signal representing the magnitude of vacuum in chamber 104 referenced to essentially atmosphere. Alternatively, the sensor may be a switch that switches at a certain pressure differential. Electric circuit connections from EMC 16 to sensor 110 and to solenoid assembly 60 are provided by a connector 114 disposed on the exterior of main body 50 and containing several electric terminals.

In module 24, nipple 52 passes through a closure wall 116 of the casing of canister 18 to communicate LDM 22 to the "clean air" side of vapor adsorbent medium within the canister casing. As shown by FIGS. 1 and 2, the "dirty air" side of the vapor adsorbent medium within canister 18 is in continuous communication with the evaporative emission space.

Now that the construction of an exemplary embodiment of module 24 has been described in detail, it is appropriate to give a general explanation of its operation. When no leak test is being performed, PPS valve 20 is operated by EMC 16 to periodically purge vapors from canister 18 and the tank headspace to engine 12. The exact scheduling of such purging is controlled by the vehicle manufacturer's requirements. During non-test times, a non-restrictive vent path to atmosphere is open through module 24 so that the evaporative emission space is communicated to atmosphere, keeping the evaporative emission space generally at atmospheric pressure.

At the commencement of a leak test on EEC system 10, solenoid assembly 60 is closed, closing the atmospheric vent path through valve 88 of LDM 22. PPS valve 20 is opened causing vacuum to be drawn in the evaporative emission space under test, including headspace of tank 14, canister 18, and any spaces, such as associated conduits, that are in communication therewith. Naturally all closures, such as the vehicle tank filler cap, must be in place to close the evaporative emission space under test, except for the vacuum being drawn through PPS valve 20.

If no extraordinary conditions, such as a "pinched line" or a "gross leak" for example, are present, vacuum regulator 90 will become effective to regulate the vacuum in the evaporative emission space to the regulator's setting, and sensor 110 will detect when regulated vacuum has been attained. Once regulation commences, an appropriate amount of time is allowed for stability to be attained before the actual leak determination, or measurement, is undertaken.

Vacuum regulation occurs in the following manner. When the drawn vacuum reaches the setting of the vacuum regulator, movable wall overcomes the force of spring 98 to unseat lip 101 from surface 99 in a fashion that maintains the evaporative emission space vacuum at the regulator's setting. At the regulated vacuum setting, air passes through nipple 86, filter element 84, passage 108, chamber 106, and through-hole 102 into chamber 104, and thence into the evaporative emission space under test, at a rate which maintains the vacuum at the regulator setting. It should be noted that vacuum regulator 90 is associated with the system in a manner that provides a flow path to atmosphere which is wholly independent of the fuel vapor purge flow path to the engine through valve 20. Hence, it may be incorporated into a system without inducing any significant effect on fuel vapor purging. This is a distinct advantage because it allows fuel vapor purging to continue according to programmed schedule during a leak detection test. A typical vacuum setting for regulator 90 is 8.0 inches $H_2O$, a vacuum considerably smaller than customary intake manifold vacuum.

The actual leak determination, or measurement, begins by re-closing PPS valve 20 while valve 88 of LDM 22 remains closed. Regulator 90 will then cease to regulate because vacuum can now only decrease in magnitude. Leakage is determined by utilizing sensor 110 to indicate loss of vacuum as test time elapses.

Figure 7A:
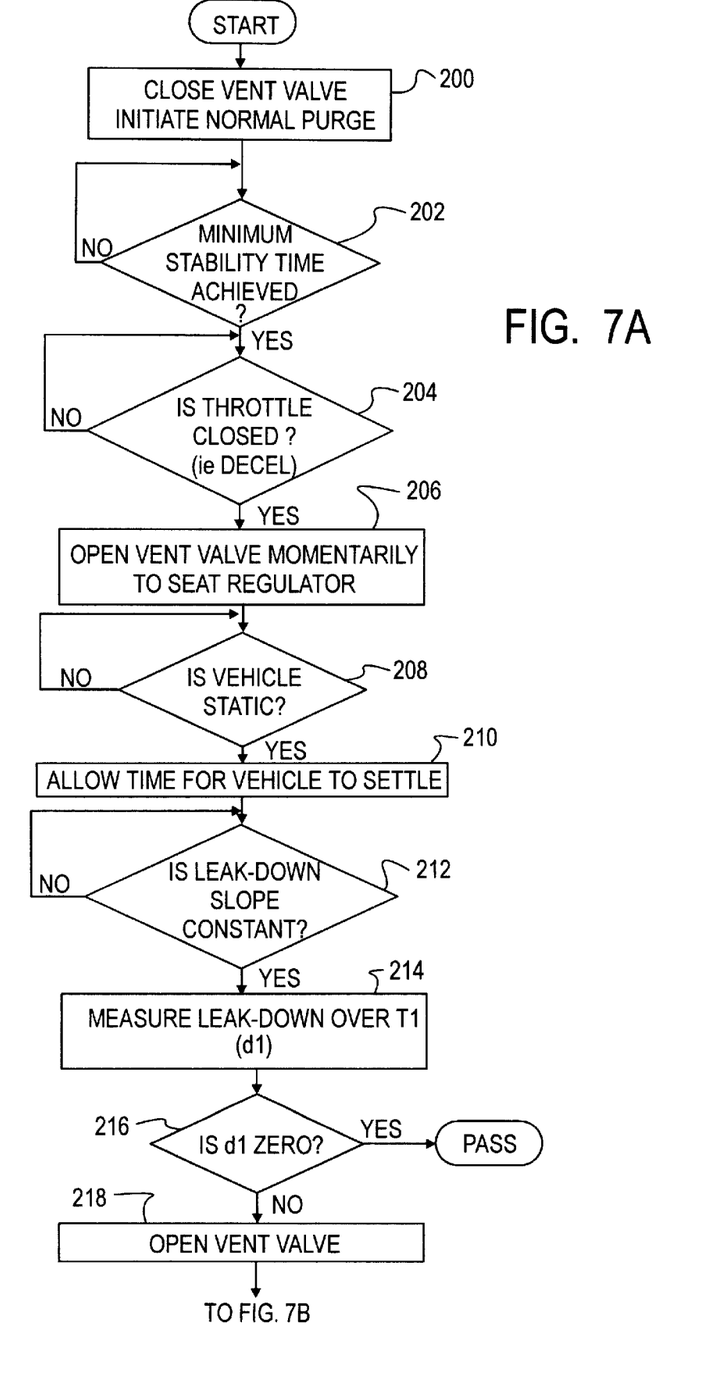
FIGS. 7A and 7B collectively form a flow diagram illustrating steps in the performance of a leak test.
Figure 7B:
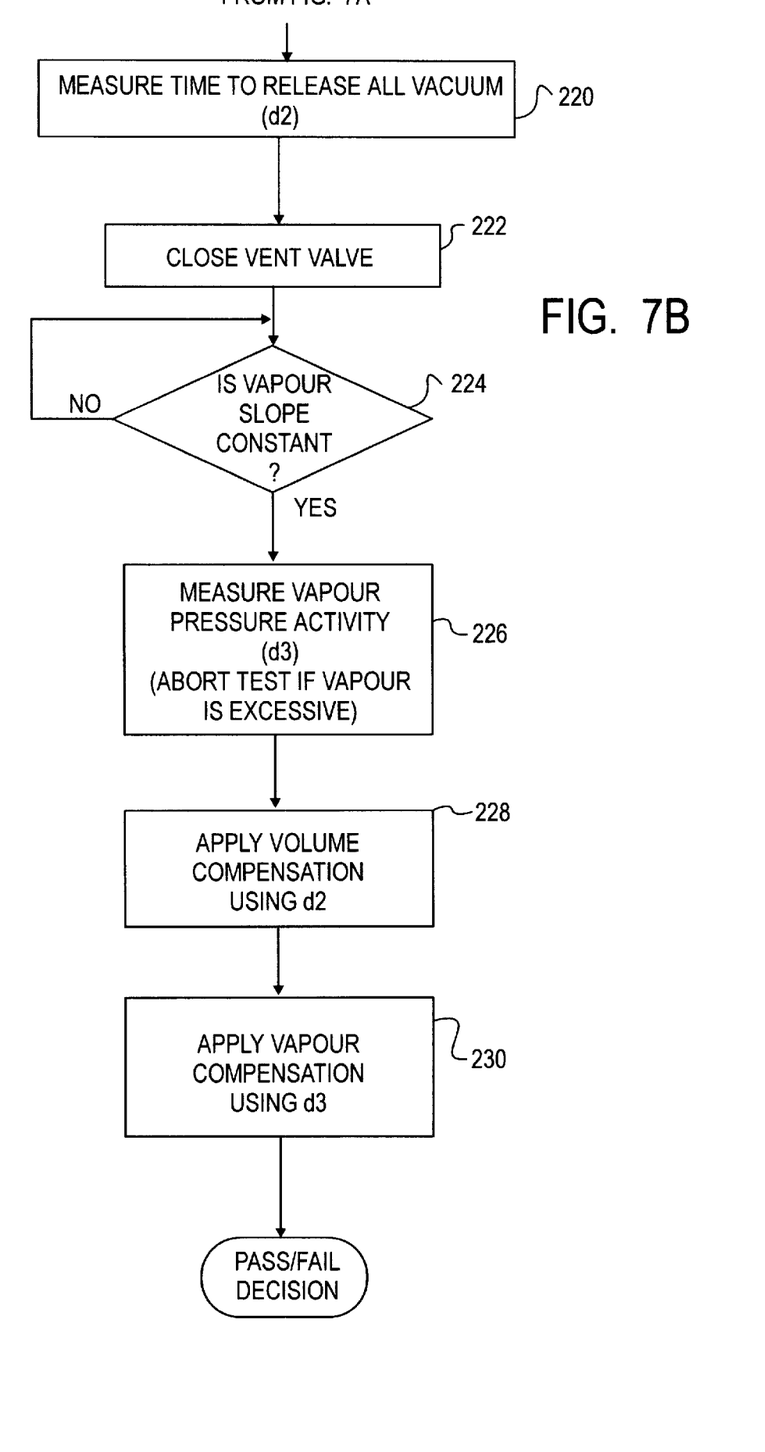

FIGS. 7A and 7B collectively illustrate steps of a leak detection test that is conducted in accordance with the foregoing general description. Step 200 comprises closing valve 88 to close the path to atmosphere through it, and also opening PPS valve 20 to intake manifold 28. Intake manifold vacuum of the running engine is therefore delivered through valve 20 to the evaporative emission space being tested, and accordingly, vacuum begins to be drawn in the evaporative emission space.

Step 202 comprises allowing a certain amount of time to elapse so that regulator 90 can become effective to perform its intended vacuum regulating function. Step 204 checks throttle position to allow the test to proceed only so long as the engine throttle remains closed while the vehicle is stopped.

After the stability time allotted by step 202 has elapsed, and while the throttle continues to be closed, step 206 is performed to cause valve 88 to momentarily open. That action will be effective to reduce the vacuum sufficiently to assure that lip 101 is sealed against surface 99, preventing flow through through-hole 102. Before the leak test is allowed to proceed, step 208 checks to confirm that the vehicle is remaining static, and step 210 allows a certain amount of settling time to allow potential disturbances, such as liquid fuel slosh in the tank, to subside.

After steps 208 and 210 have concluded, the presence of a leak will be reflected as a signal that decreases at a substantially constant rate. Pressure sensor 110 provides a signal representative of vacuum, and step 212 confirms that a graph plot of vacuum vs. time would show the vacuum to be decreasing with a substantially constant slope, which will be the case for leaks less than a gross leak provided that a stable environment continues to exist for the test. Absence of a leak would yield a graph plot that has zero slope; decreasing vacuum at other than a substantially constant slope would be indicative of system instability.

Once the assurance of step 212 has been obtained, step 214 measures the decrease in vacuum that occurs over a defined time T1. That measurement is designated d1. Step 216 distinguishes the absence of leakage from leakage less than a gross leak. If there is no leakage, vacuum will remain unchanged so that the corresponding graph plot slope is zero. In such a case, the test is deemed to have been passed, and an appropriate indication is given. That concludes the test.

On the other hand, a leak less than a gross leak will be measured for effective leak area size. The measurement is obtained by first performing step 218 which comprises opening valve 88. Upon the opening of valve 88, step 220 commences measuring the time required for vacuum to be reduced to zero. That measurement is designated d2, and it is indicative of the volume of the evaporative emission space, i.e. the volume of the fuel system that is occupied by vaporized, as distinguished from liquid, fuel. Upon the vacuum being reduced to zero, step 222 re-closes valve 88 preparatory to obtaining a measurement of the rate of fuel volatilization in the tank.

Step 224 monitors the pressure in the evaporative emission space for the attainment of a substantially constant rate of increase of pressure therein, which is deemed indicative of the rate at which liquid fuel is being volatized. Provided that the rate is not excessive, as determined by step 226, the rate of pressure increase is logged as a parameter designated d3.

Steps 228 and 230 compute and apply respective correction factors to the d1 measurement. The corrected measurement is compared against a predefined area to determine whether the measured area is acceptable or unacceptable, and a corresponding indication of either a pass decision or a fail decision is given.

While a presently preferred embodiment of the invention has been illustrated and described, it should be appreciated that principles are applicable to other embodiments that fall within the scope of the following claims.

What is claimed is:

1. A leak detection test method for an evaporative emission space of a fuel storage system of an automotive vehicle comprising:

creating a differential between pressure in an evaporative emission space and atmospheric pressure and regulating, by a regulator valve, the created differential to a defined differential sufficient to perform a leak detection test on the evaporative emission space;

isolating the evaporative emission space so that reduction in the regulated created differential is indicative of leakage from the evaporative emission space; and sensing reduction in the regulated created differential;

in which the step of creating a differential between pressure in an evaporative emission space and atmospheric pressure and regulating, by a regulator valve, the created differential to a defined differential sufficient to perform a leak detection test on the evaporative emission space comprises creating vacuum in the evaporative emission space and regulating the created vacuum to a regulated vacuum by a vacuum regulator valve.

2. A method as set forth in claim 1 in which regulated created vacuum is created by communicating the evaporative emission space to intake manifold vacuum of an internal combustion engine.

3. A method as set forth in claim 2 in which the step of communicating the evaporative emission space to intake manifold vacuum of an internal combustion engine comprises opening a purge valve through which the evaporative emission space is communicated to intake manifold vacuum and maintaining the purge valve open until the isolation step so that purging of fuel vapor from the evaporative emission space can occur until the isolation step occurs.

4. A method as set forth in claim 1 including the step of momentarily venting the evaporative emission space to atmosphere after the vacuum regulator valve begins to regulate.

5. A leak detection test method for an evaporative emission space of a fuel storage system of an automotive vehicle comprising:

creating a differential between pressure in an evaporative emission space and atmospheric pressure and regulating, by a regulator valve, the created differential to a defined differential sufficient to perform a leak detection test on the evaporative emission space;

isolating the evaporative emission space so that reduction in the regulated created differential is indicative of leakage from the evaporative emission space; and sensing reduction in the regulated created differential;

in which the step of sensing reduction in the regulated created differential comprises sensing such reduction by a sensor that develops an electric signal indicative of such reduction; and including the step of detecting a substantially constant rate of reduction in the regulated created differential by detecting substantially constant rate of change in the electric signal, and then measuring the rate of change in the electric signal over a defined time interval.

6. A leak detection test method for an evaporative emission space of a fuel storage system of an automotive vehicle comprising:

creating a differential between pressure in an evaporative emission space and atmospheric pressure and regulating, by a regulator valve, the created differential to a defined differential sufficient to perform a leak detection test on the evaporative emission space;

isolating the evaporative emission space so that reduction in the regulated created differential is indicative of leakage from the evaporative emission space; and sensing reduction in the regulated created differential;

including the step of detecting a substantially constant rate of reduction in the regulated created differential, and then measuring the reduction over a defined time interval.

7. A method as set forth in claim 6 including, after the defined time interval has elapsed, the step of compensating the measured reduction by a factor related to the volume of the evaporative emission space.

8. A method as set forth in claim 7 in which the step of compensating the measured reduction by a factor related to the volume of the evaporative emission space comprises venting the evaporative emission space to atmosphere after the defined time interval has elapsed, and measuring the time required for the differential to decrease to substantially zero.

9. A method as set forth in claim 7 including, after the defined time interval has elapsed, the step of compensating the measured reduction by a factor related to the rate of volatilization of liquid fuel in the fuel storage system.

10. A method for initializing an evaporative emission space of a fuel storage system of an automotive vehicle for a leak detection test comprising:

creating a differential between pressure in an evaporative emission space and atmospheric pressure and regulating, by a regulator valve, the created differential to a defined differential sufficient to perform a leak detection test on the evaporative emission space;

the regulating step comprising closing a flow path through a movable wall of the regulator valve when the created differential is less than the defined differential and opening the flow path when the created differential is greater than the defined differential.

11. A method as set forth in claim 10 in which the step of creating a differential between pressure in an evaporative emission space and atmospheric pressure and regulating, by a regulator valve, the created differential to a defined differential sufficient to perform a leak detection test on the evaporative emission space comprises creating vacuum in the evaporative emission space and regulating the vacuum to a defined vacuum.

* * * * *